United States Patent
Nogami

(10) Patent No.: US 10,668,562 B2
(45) Date of Patent: Jun. 2, 2020

(54) LASER MACHINING APPARATUS

(71) Applicant: FANUC CORPORATION, Yamanashi (JP)

(72) Inventor: Takeshi Nogami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 99 days.

(21) Appl. No.: 15/996,171

(22) Filed: Jun. 1, 2018

(65) Prior Publication Data

US 2018/0354070 A1    Dec. 13, 2018

(30) Foreign Application Priority Data

Jun. 12, 2017   (JP) .................................. 2017-115154

(51) Int. Cl.
*B23K 26/08*    (2014.01)
*B23K 26/082*   (2014.01)
*B23K 26/03*    (2006.01)

(52) U.S. Cl.
CPC .......... *B23K 26/082* (2015.10); *B23K 26/032* (2013.01)

(58) Field of Classification Search
CPC .... B23K 26/082; B23K 26/032; B23K 26/00; B23K 26/08; B23K 26/24; G06F 19/401; G06F 19/42; G06F 15/00
See application file for complete search history.

(56) References Cited

U.S. PATENT DOCUMENTS

2008/0035619 A1 * 2/2008 Hamaguchi ............ B23K 26/04
                                                    219/121.79

FOREIGN PATENT DOCUMENTS

| CN | 101125392 A | 2/2008 |
|----|-------------|--------|
| JP | H11-000784 A | 1/1999 |
| JP | 2003-170284 A | 6/2003 |
| JP | 2007-021579 A | 2/2007 |
| JP | 2008-043971 A | 2/2008 |

(Continued)

OTHER PUBLICATIONS

An Office Action "Decision to Grant a Patent" mailed by the Japanese Patent Office dated Aug. 13, 2019, which corresponds to Japanese Patent Application No. 2017-115154 and is related to U.S. Appl. No. 15/996,171; with English translation.

(Continued)

*Primary Examiner* — Brian W Jennison
(74) *Attorney, Agent, or Firm* — Studebaker & Brackett PC

(57) ABSTRACT

A laser machining apparatus includes a scanner head having at least two galvanometer mirrors and galvano motors, a moving means for moving the scanner head, a movement control apparatus for controlling the moving means, and a scanner control apparatus having a galvano motor control unit for controlling rotational driving angles of the galvano motors. The movement control apparatus has a rotation angle detection unit for detecting a rotation angle of the scanner head with respect to the moving direction. The scanner control apparatus has a mirror angle calculation unit for calculating, from data on the rotation angle, rotational driving angles of the mirrors so that an intersecting direction of the laser beam corresponds to a predetermined direction with respect to the moving direction. The galvano motor control unit controls the galvano motors so that the rotational driving angles calculated by the mirror angle calculation unit are set.

3 Claims, 12 Drawing Sheets

(56) References Cited

FOREIGN PATENT DOCUMENTS

JP  2009-291811 A  12/2009
JP  2014-213374 A  11/2014

OTHER PUBLICATIONS

An Office Action mailed by the Japanese Patent Office dated Jan. 22, 2019, which corresponds to Japanese Patent Application No. 2017-115154 and is related to U.S. Appl. No. 15/996,171; with English translation.
An Office Action mailed by the State Intellectual Property Office of the People's Republic of China dated Jan. 6, 2020, which corresponds to Chinese Patent Application No. 201810586448.4 and is related to U.S. Appl. No. 15/996,171 with English language translation.

* cited by examiner

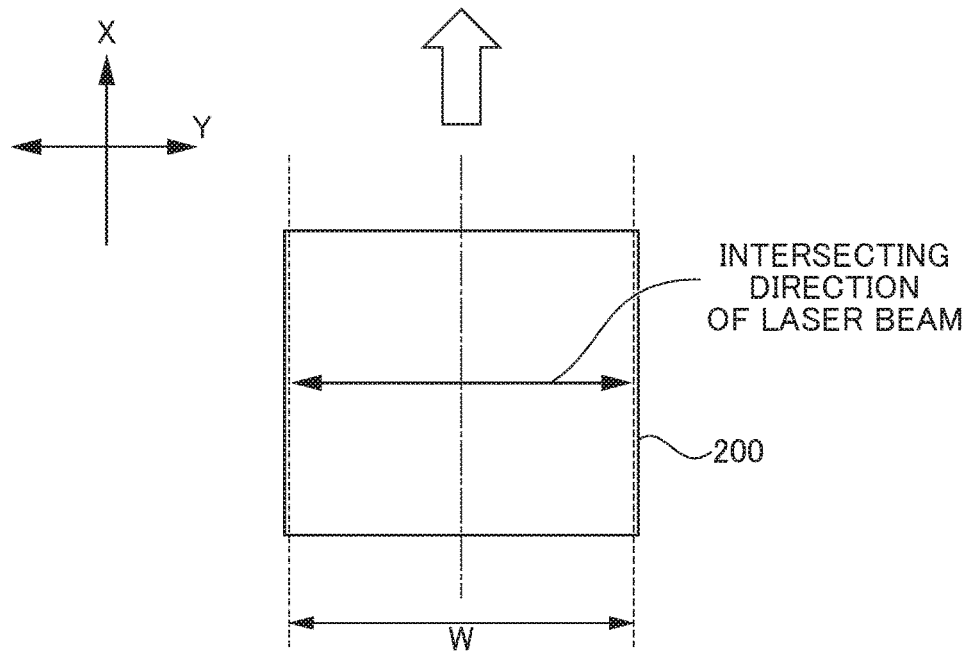
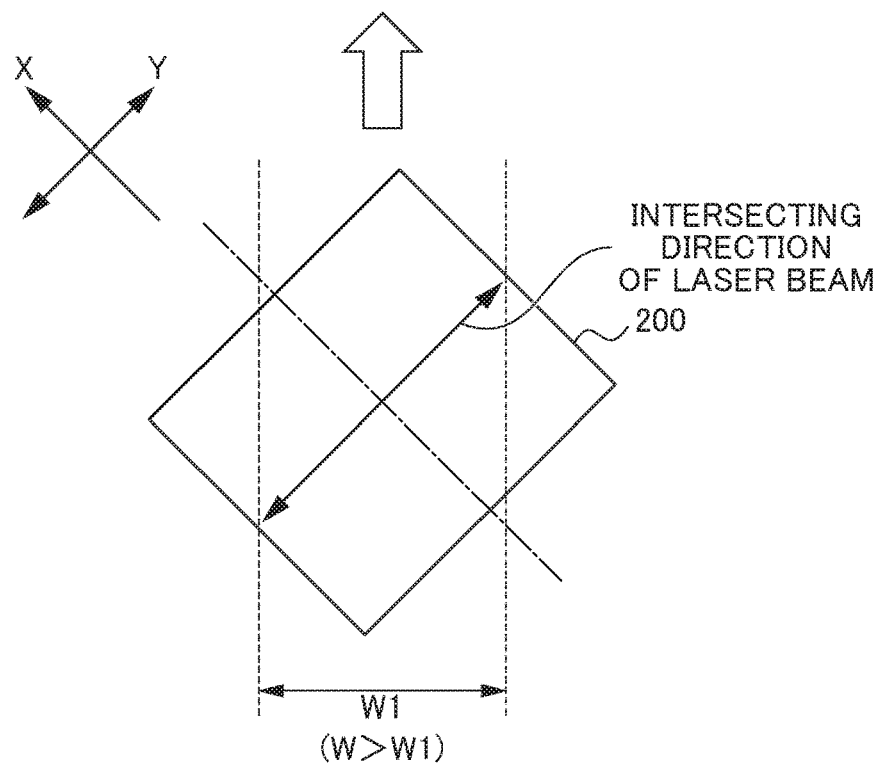

US 10,668,562 B2

LASER MACHINING APPARATUS

This application is based on and claims the benefit of priority from Japanese Patent Application No. 2017-115154, filed on 12 Jun. 2017, the content of which is incorporated herein by reference.

BACKGROUND OF THE INVENTION

Field of the Invention

The present invention relates to a laser machining apparatus.

Related Art

A conventional laser machining apparatus is known, which performs machining such as welding by scanning a workpiece with a laser beam in a predetermined direction. One of such laser machining apparatuses scans a workpiece with a laser beam in a direction intersecting a moving direction of a scanner head while moving the scanner head for outputting the laser beam.

FIG. 11 shows a conventional laser machining apparatus 100 configured so that a robot 300 moves a scanner head 200. The scanner head 200, which is attached to a tip portion 301a of an arm 301 of the robot 300, moves in an X direction upon the movement of the arm 301.

As shown in FIG. 12, the scanner head 200 has one galvanometer mirror 201 for reflecting a laser beam L and a galvano motor 202 for rotationally driving the galvanometer mirror 201. The galvanometer mirror 201 is rotationally driven by the galvano motor 202 at a predetermined rotation angle and frequency, whereby the scanner head 200 scans a workpiece 400 with the laser beam L with a predetermined swing width. Accordingly, in the case of performing weaving welding by such a laser machining apparatus 100, as an example, the scanner head 200 scans the workpiece 400 with the laser beam L with a predetermined swing width W while moving along a machining path (a path instructed by a robot) on the workpiece 400, to form a zigzag welding locus 500 corresponding to the swing width W on the workpiece 400.

Patent Document 1: Japanese Unexamined Patent Application, Publication No. 2003-170284

Patent Document 2: Japanese Unexamined Patent Application, Publication No. 2007-21579

SUMMARY OF THE INVENTION

In order to secure the quality of welding on the workpiece 400, the laser beam L output from the scanner head 200 with the predetermined swing width W is preferably output for scanning in a predetermined direction intersecting the machining path (for example, in the direction orthogonal to the machining path), as shown in FIG. 13A. To do so, the scanner head 200 needs to move while keeping a constant angle with respect to the moving direction (hereinafter, this angle is referred to as a rotation angle of the scanner head).

However, in the case of a curved machining path, it may be difficult to keep the rotation angle of the scanner head 200 constant with respect to the moving direction of the scanner head 200. As an example, such difficulty is seen in the case where the robot 300 rotates around a Z-axis or the arm 301 moves in a Y direction on the basis of a curved machining path of the curve, and accordingly the scanner head 200 of the tip portion 301a of the arm 301 moves in the direction in an arc shape, or in the case where the scanner head 200 needs to be moved in an oblique direction along the machining path.

When the rotation angle of the scanner head 200 with respect to the moving direction of the scanner head 200 is shifted from the initial angle, the direction in which the laser beam L intersects the machining path is also shifted from the predetermined direction, as shown in FIG. 13B. As a result, a width W1 of the welding locus formed along the machining path is different from the predetermined swing width W (W>W1). Accordingly, such a conventional laser machining apparatus has been desired to be improved from the viewpoint of maintaining the quality of welding.

The object of present invention, which has been made in view of the above-described circumstances, is to provide a machining apparatus capable of scanning a workpiece with a laser beam output from a scanner head in a predetermined direction even when a rotation angle of a scanner head is shifted with respect to the moving direction of the scanner head.

(1) A laser machining apparatus (for example, a laser machining apparatus 1 described below) according to the present invention includes a scanner head (for example, a scanner head 4 described below) having at least two galvanometer mirrors (for example, galvanometer mirrors 41, 42 described below) for reflecting a laser beam and galvano motors (for example, galvano motors 41a, 42a described below) respectively for rotationally driving the galvanometer mirrors, and being capable of scanning a workpiece (for example, a workpiece 10 described below) with the laser beam, a moving means (for example, a robot 2 described below) for moving the scanner head with respect to the workpiece, a movement control apparatus (for example, a robot control apparatus 5 described below) for controlling the moving means, and a scanner control apparatus (for example, a scanner control apparatus 6 described below) having a galvano motor control unit (for example, a galvano motor control unit 6e described below) for controlling rotational driving angles of the galvano motors, so that the laser beam is output for scanning from the scanner head to the workpiece in a direction intersecting a moving direction of the scanner head. The movement control apparatus has a rotation angle detection unit (for example, a rotation angle detection unit 5e described below) for detecting a rotation angle of the scanner head with respect to the moving direction of the scanner head. The scanner control apparatus has a mirror angle calculation unit (for example, a mirror angle calculation unit 6g described below) for receiving data on the rotation angle of the scanner head detected by the rotation angle detection unit, and calculating, from the data on the rotation angle, rotational driving angles of the galvanometer mirrors, so that the intersecting direction of the laser beam corresponds to a predetermined direction with respect to the moving direction of the scanner head. The galvano motor control unit of the scanner control apparatus controls the galvano motors so that the rotational driving angles of the galvanometer mirrors correspond to the rotational driving angles calculated by the mirror angle calculation unit.

(2) In the laser machining apparatus according to (1), the movement control apparatus may have a moving speed detection unit (for example, a moving speed detection unit 5f described below) for detecting a moving speed of the scanner head moved by the moving means. A locus of the laser beam output for scanning the workpiece may have a predetermined swing width and a predetermined pitch. The scanner control apparatus may have a scanning speed calculation unit (for example, a scanning speed calculation unit 6c described below) for receiving data on the moving speed of the scanner head detected by the moving speed detection unit, and newly calculating, from the data on the moving speed, a scanning speed so that the locus of the laser beam output for scanning the workpiece has the predetermined pitch. The galvano motor control unit of the scanner control apparatus may control the galvano motors so that the laser beam is output for scanning at the scanning speed newly calculated by the scanning speed calculation unit.

(3) The laser machining apparatus according to (2) may further include a laser oscillator (for example, a laser oscillator 3 described below) for outputting the laser beam to the scanner head. The scanner control apparatus may have a change amount calculation unit (for example, a change amount calculation unit 6h described below) for calculating a change amount of the scanning speed newly calculated by the scanning speed calculation unit with respect to a preset reference speed value, a laser output calculation unit (for example, a laser output calculation unit 6i described below) for newly calculating a laser output increased or decreased upon increase or decrease of the change amount calculated by the change amount calculation unit, and a laser command output unit (for example, a laser command output unit 6f described below) for outputting a laser command to the laser oscillator so that the laser beam output by the laser oscillator corresponds to the laser output newly calculated by the laser output calculation unit.

The present invention enables the provision of a laser machining apparatus capable of scanning a workpiece with a laser beam output from a scanner head in a predetermined direction, even when a rotation angle of the scanner head with respect to a moving direction of the scanner head is shifted.

BRIEF DESCRIPTION OF THE DRAWINGS

FIG. 13A is a diagram that explains the rotation angle of the scanner head with respect to the moving direction of the scanner head in the conventional laser machining apparatus.

FIG. 13B is another diagram that explains the rotation angle of the scanner head with respect to the moving direction of the scanner head in the conventional laser machining apparatus.

DETAILED DESCRIPTION OF THE INVENTION

Some embodiments of the present invention will be described below with reference to the drawings.

[Overall Configuration of Laser Machining Apparatus]

Figure 1:
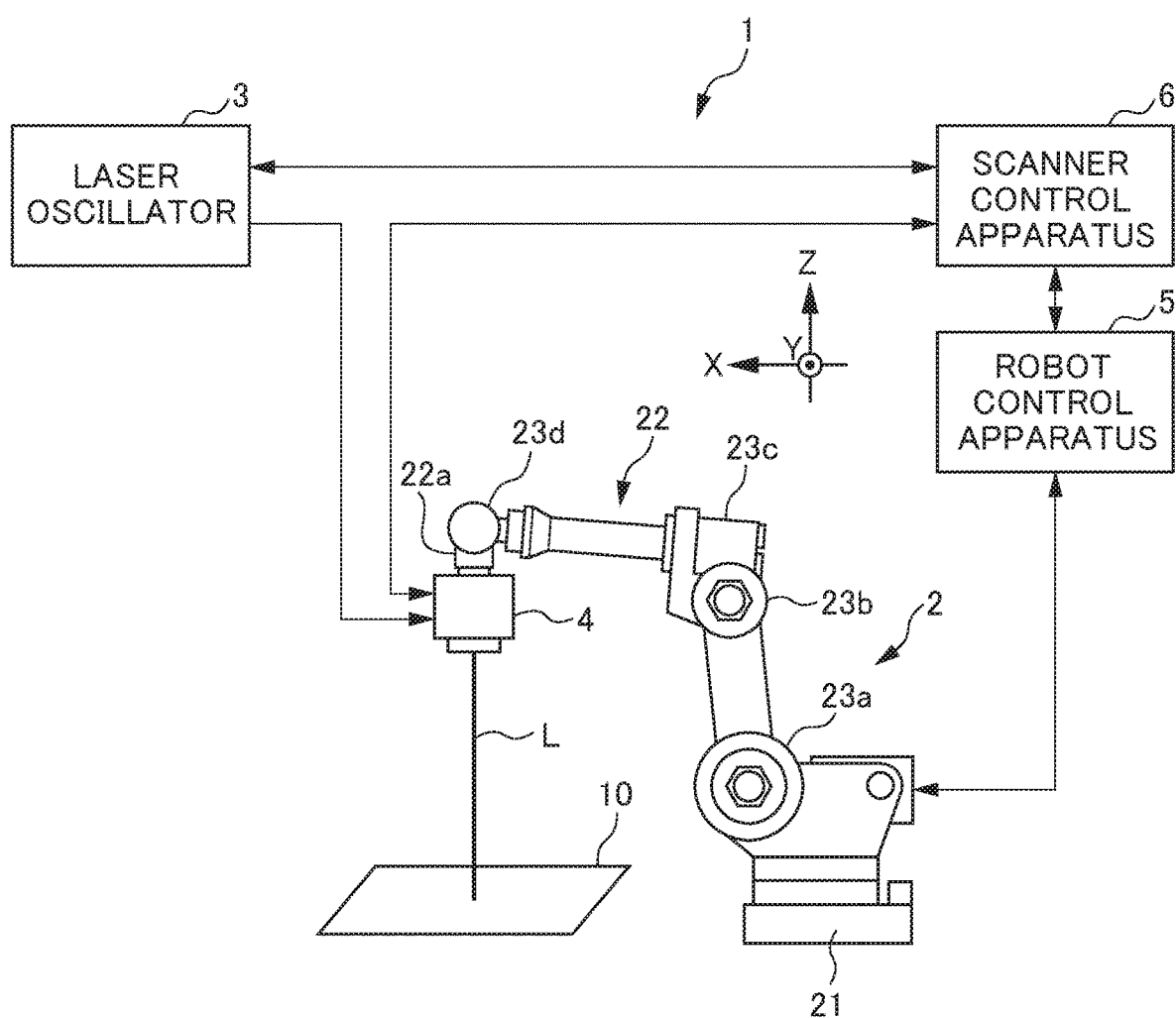
FIG. 1 is a block diagram illustrating the overall configuration of a laser machining apparatus according to the present invention.
Figure 2:
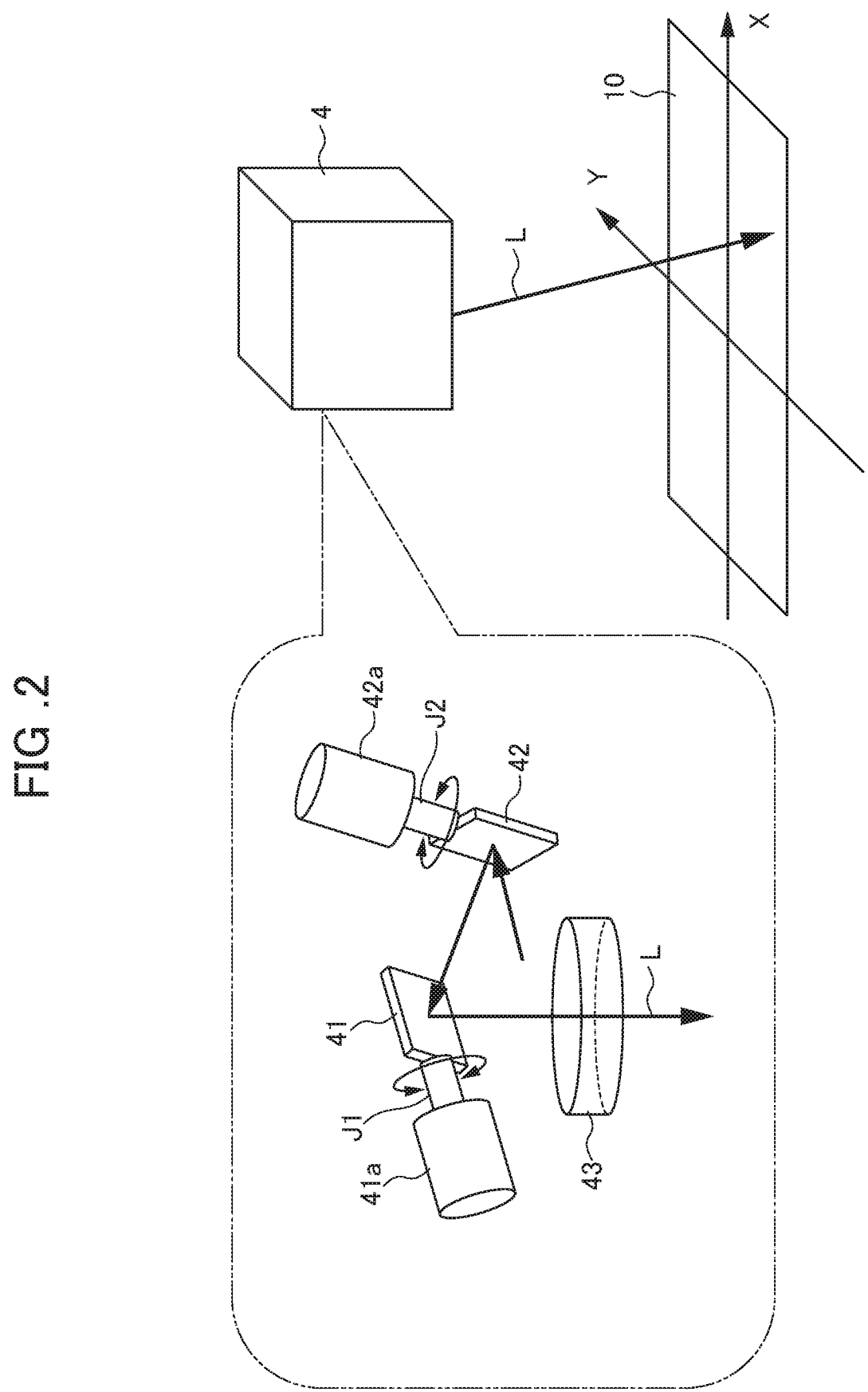
FIG. 2 is a diagram that explains an optical system of a scanner head in the laser machining apparatus according to the present invention.

FIG. 1 is a block diagram illustrating the overall configuration of a laser machining apparatus according to the present invention. FIG. 1 shows one embodiment of a laser machining apparatus configured as a remote laser welding robot system. FIG. 2 is a diagram that explains an optical system of a scanner head in the laser machining apparatus according to the present invention. The overall configuration of the laser machining apparatus shown in FIG. 1 and FIG. 2 is common in the respective embodiments described below. A laser machining apparatus 1 includes a robot 2, a laser oscillator 3, a scanner head 4, a robot control apparatus 5, and a scanner control apparatus 6.

The robot 2, which is an articulated type robot having a plurality of joints, includes a base part 21, an arm 22, and a plurality of joint shafts 23a to 23d each having a rotary axis extending in a Y direction. The robot 2 also has a plurality of robot motors including a robot motor (not shown) for rotating the arm 22 around a Z direction as a rotary axis, and robot motors (not shown) respectively for rotating the joint shafts 23a to 23d to move the arm 22 in an X direction. Each robot motor is driven to be rotated on the basis of the driving data received from the robot control apparatus 5 described below.

The scanner head 4 is fixed to a tip portion 22a of the arm 22 of the robot 2. Accordingly, the robot 2 is capable of moving the scanner head 4 in predetermined X and Y directions at a predetermined robot speed by rotational driving of respective robot motors. The robot 2 is one example of a moving means according to the present invention.

The laser oscillator 3 is configured with a laser medium, an optical resonator, an excitation source and the like (none of them are shown). The laser oscillator 3 generates a laser beam having laser output based on a laser output command given by the scanner control apparatus 6 described below and outputs the generated laser beam to the scanner head 4.

The scanner head 4 is a galvano scanner capable of scanning a workpiece 10 with a laser beam L by receiving the laser beam L output by the laser oscillator 3. As shown in FIG. 2, the scanner head 4 includes two galvanometer mirrors 41, 42 for reflecting the laser beam L output by the laser oscillator 3, galvano motors 41a, 42a respectively for rotationally driving the galvanometer mirrors 41, 42, and a cover glass 43.

The galvanometer mirrors 41, 42 are configured to be rotatable respective around two rotary axes J1, J2 which are orthogonal to each other. The galvano motors 41a, 42a are driven to be rotated on the basis of the driving data obtained from the scanner control apparatus 6 described below to independently rotate the galvanometer mirrors 41, 42 around the rotary axes J1, J2.

The laser beam L output by the laser oscillator 3 is output from the scanner head 4 after being sequentially reflected by the two galvanometer mirrors 41, 42, and then reaches a machining point (welding point) on the workpiece 10. At this time, when the two galvanometer mirrors 41, 42 are rotated respectively by the galvano motors 41a, 42a, the incident angles of the laser beam L incident on the galvanometer mirrors 41, 42 change sequentially. As a result, the laser beam L is output onto the workpiece 10 from the scanner head 4 for scanning along a predetermined path, to form a welding locus on the workpiece 10 along the scanning path of the laser beam L.

The rotational driving of the galvano motors 41a, 42a is appropriately controlled to change the rotation angles of the respective galvanometer mirrors 41, 42, whereby the scanning path of the laser beam L output from the scanner head 4 onto the workpiece 10 is enabled to be arbitrarily changed in the X and Y directions.

The cover glass 43 having a cylindrical shape has functions of transmitting the laser beam L sequentially reflected by the galvanometer mirrors 41, 42 to be directed toward the workpiece 10, and of protecting the inside of the scanner head 4.

The robot control apparatus 5 controls the operation of the robot 2 by outputting driving control data to each robot motor of the robot 2. That is, the robot control apparatus 5 controls the rotational driving of each robot motor by outputting the driving control data to each robot motor, thereby moving the scanner head 4 attached to the tip portion 22a of the arm 22 in the X and Y directions with respect to the workpiece 10. The robot control apparatus 5 is one example of the movement control means according to the present invention.

The scanner control apparatus 6 outputs a laser output command to the laser oscillator 3 so that a laser beam having a desired output is output. The scanner control apparatus 6 controls scanning with the laser beam L output from the scanner head 4 onto the workpiece 10 by outputting the driving control data to the galvano motors 41a, 42a of the scanner head 4 to rotate the galvanometer mirrors 41, 42.

It is noted that the description below is about the case in which the scanner control apparatus 6 in each embodiment below controls the scanner head 4 so that the intersecting direction of the laser beam L is orthogonal to the moving direction of the scanner head 4, thereby scanning the workpiece 10 with the laser beam L with a predetermined swing width W and a predetermined pitch P. In such a case, a zigzag welding locus is formed on the workpiece 10.

First Embodiment

Figure 3:
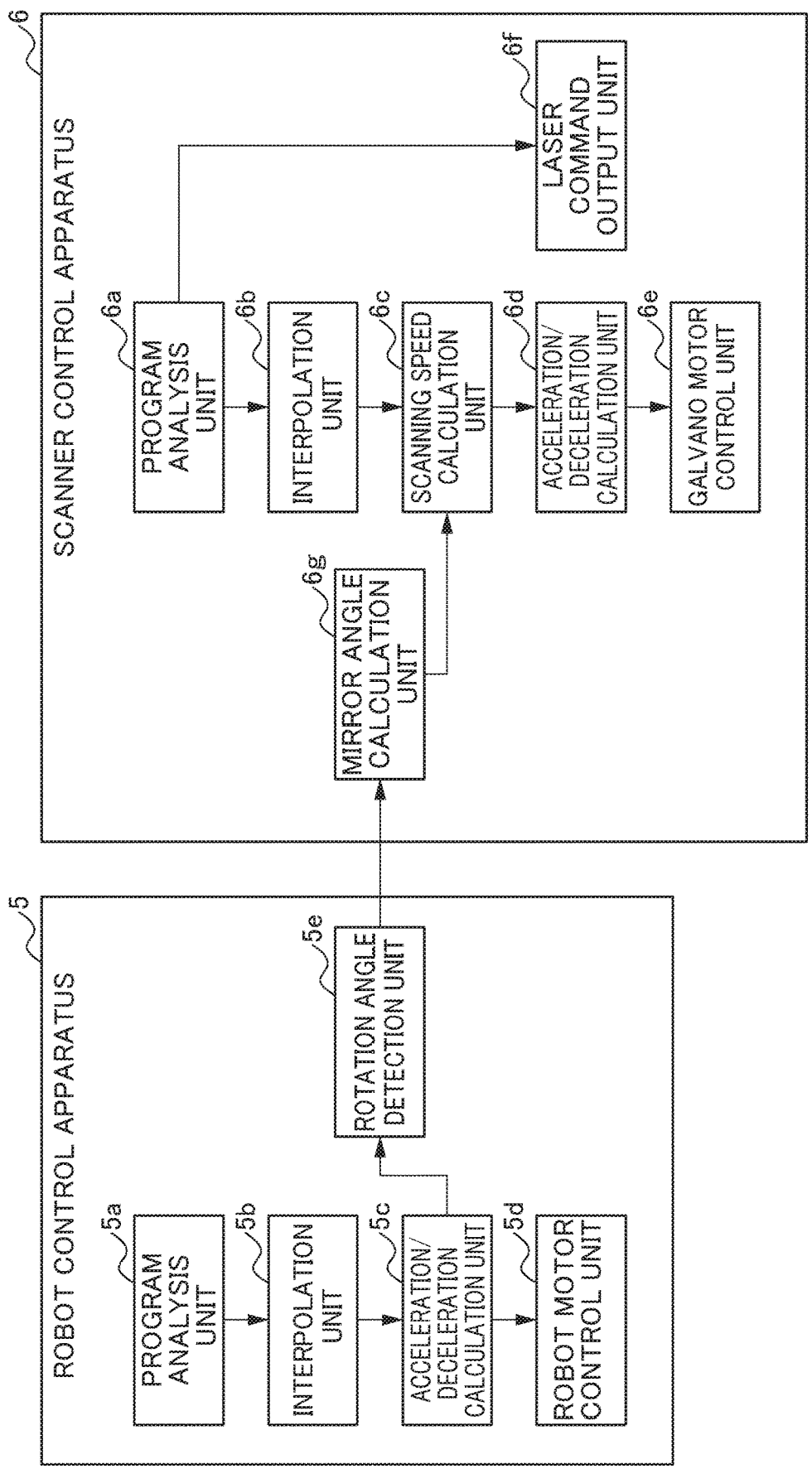
FIG. 3 is a block diagram illustrating the configurations of a robot control apparatus and a scanner control apparatus of the laser machining apparatus according to a first embodiment.

The configurations of the robot control apparatus 5 and the scanner control apparatus 6 are further detailed below with reference to the block diagram shown in FIG. 3. FIG. 3 is a block diagram illustrating the configurations of the robot control apparatus 5 and the scanner control apparatus 6 of the laser machining apparatus 1 according to the first embodiment. The robot control apparatus 5 has a program analysis unit 5a, an interpolation unit 5b, an acceleration/deceleration calculation unit 5c, a robot motor control unit 5d, and a rotation angle detection unit 5e.

The program analysis unit 5a analyzes a welding program including the instruction point input by an input apparatus (not shown) to the robot control apparatus 5 and generates operation command information on the moving direction of the scanner head 4 and the targeted robot speed. The generated operation command information is output to the interpolation unit 5b.

The interpolation unit 5b performs interpolation so that the moving path of the scanner head 4 between the instruction points becomes smooth along a desired machining path on the workpiece 10, on the basis of the operation command information output by the program analysis unit 5a. The interpolation includes the types of a straight line and a curved line based on the machining path. The generated interpolation information is output to the acceleration/deceleration calculation unit 5c.

The acceleration/deceleration calculation unit 5c performs acceleration/deceleration processing of the operation of the robot 2 on the basis of the interpolation information output by the interpolation unit 5b and various preset parameters, to generate driving information of the respective robot motors for moving the scanner head 4 along a desired machining path. The generated driving information of the respective robot motors is output to the robot motor control unit 5d. The generated driving information of the respective robot motors is also output to the rotation angle detection unit 5e.

The robot motor control unit 5d generates driving data of the respective robot motors on the basis of the driving information output by the acceleration/deceleration calculation unit 5c and drives the respective robot motors on the basis of the generated driving data.

The rotation angle detection unit 5e detects the rotation angle (rotation angle with the Z direction as the rotary axis in the present embodiment) of the scanner head 4 with respect to the moving direction of the scanner head 4 attached to the tip portion 22a of the arm 22, from the driving information of the respective robot motors output by the acceleration/deceleration calculation unit 5c. The moving direction and the rotation angle of the scanner head 4 are determined by the operation of the arm 22. The operation of the arm 22 is detectable from the driving information of the respective robot motors.

The rotation angle may be obtained from the driving information of the robot motors by use of a predetermined arithmetic expression, or may be obtained on the basis of a previously-prepared data table in which the driving information of the robot motors and the rotation angle of the scanner head 4 are associated.

The rotation angle detection unit 5e detects the rot ion angle of the scanner head 4 in each predetermined control cycle, which has been set in advance. Every time the rotation angle detection unit 5e generates the data on the rotation angle of the scanner head 4 in each predetermined control cycle, the rotation angle detection unit 5e outputs the generated data on the rotation angle to a mirror angle calculation unit 6g described below of the scanner control apparatus 6.

The scanner control apparatus 6 has a program analysis unit 6a, an interpolation unit 6b, a scanning speed calculation unit 6c, an acceleration/deceleration calculation unit 6d, a galvano motor control unit 6e, a laser command output unit 6f, and the mirror angle calculation unit 6g.

The program analysis unit 6a analyzes the welding program input by an input device not shown to the scanner control apparatus 6 and generates the operation command information on the scanning direction of the scanner head 4 and the targeted robot speed. Then, the program analysis unit 6a outputs the generated operation command information to the interpolation unit 6b, and also generates laser output information on the laser beam L output from the scanner head 4 and outputs the generated laser output information to the laser command output unit 6f.

The interpolation unit 6b performs interpolation of the moving path of the scanner head 4 on the basis of the operation command information output by the program analysis unit 6a and generates interpolation information. The generated interpolation information is output to the scanning speed calculation unit 6c.

The scanning speed calculation unit 6c calculates the scanning speed of the laser beam L. The scanning speed is the speed (frequency) at which the galvanometer mirrors 41, 42 are rotated. The scanning speed is calculated on the basis of the interpolation information output by the interpolation unit 6b and the information on the rotational driving angles of the respective galvanometer mirrors 41, 42 output by the mirror angle calculation unit 6g described below. The interpolation information output by the interpolation unit 6b is the interpolation information including the targeted robot speed obtained by the program analysis unit 6a. The data on the scanning speed calculated by the scanning speed calculation unit 6c is output to the acceleration/deceleration calculation unit 6d.

The acceleration/deceleration calculation unit 6d performs acceleration/deceleration processing of the galvano motors 41a, 42a on the basis of the information on the rotational speeds of the galvanometer mirrors 41, 42 output by the scanning speed calculation unit 6c and various parameters, and generates the driving information of the respective galvano motors 41a, 42a for scanning with the laser beam L at a predetermined scanning speed in a predetermined scanning direction. The generated driving information of the respective galvano motors 41a, 42a is output to the galvano motor control unit 6e.

The galvano motor control unit 6e generates the driving control data of the respective galvano motors 41a, 42a on the basis of the driving information output by the acceleration/deceleration calculation unit 6d, and drives the respective galvano motors 41a, 42a on the basis of the generated driving control data.

The laser command output unit 6f outputs the laser output command to the laser oscillator 3 so that the laser beam L to be output from the scanner head 4 corresponds to a desired laser output based on the laser output information output by the program analysis unit 6a.

Every time the mirror angle calculation unit 6g receives the data on the rotation angle of the scanner head 4 from the rotation angle detection unit 5e of the robot control apparatus 5 in each predetermined control cycle, the mirror angle calculation unit 6g calculates the optimum rotational driving angles of the respective galvanometer mirrors 41, 42 on the basis of the received data on the rotation angle, so that the laser beam L is output in the predetermined swing width W and that the intersecting direction of the laser beam L is orthogonal to the moving direction of the scanner head 4. The information on the calculated rotational driving angles is output to the above-described scanning speed calculation unit 6c. Accordingly, every time the scanning speed calculation unit 6c generates the driving information of the respective galvano motors 41a, 42a in each predetermined control cycle so that the laser beam L is output at the predetermined scanning speed in the predetermined scanning direction, the scanning speed calculation unit 6c outputs the generated driving information of the respective galvano motors 41a, 42a to the acceleration/deceleration calculation unit 6d.

Figure 4:
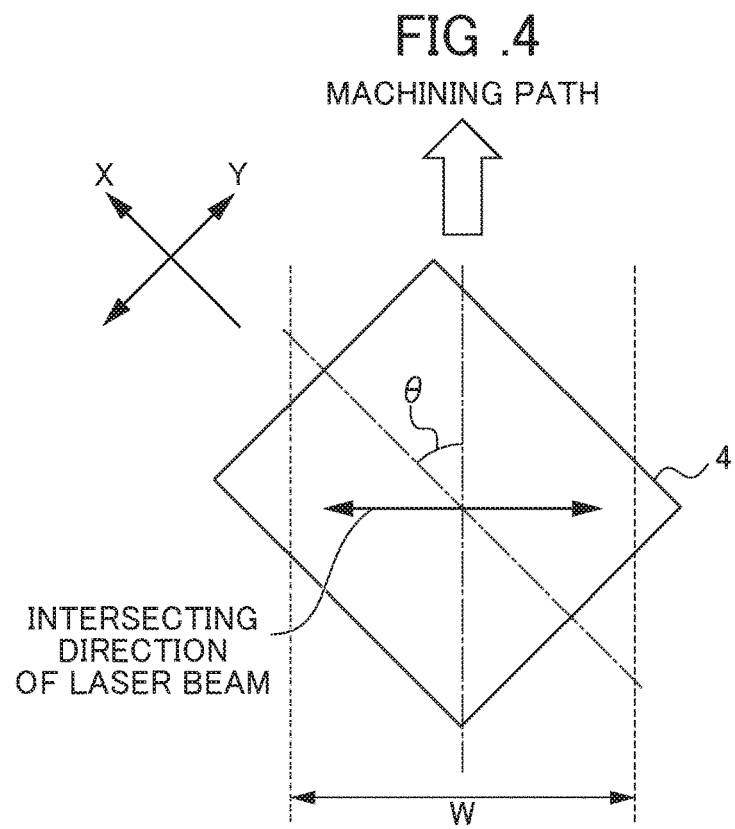
FIG. 4 is a diagram that explains the operation of the laser machining apparatus according to the first embodiment, schematically illustrating the state in which the rotation angle of the scanner head with respect to the moving direction of the scanner head is shifted.
Figure 5:
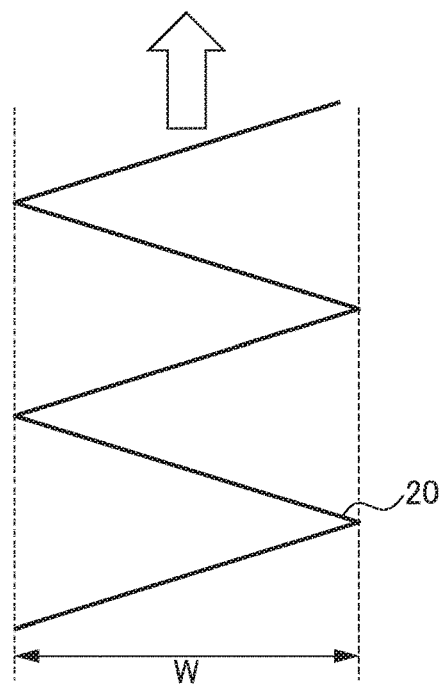
FIG. 5 is a diagram illustrating a welding locus formed on a workpiece by the scanner head in the state shown in FIG. 4.
Figure 6A:
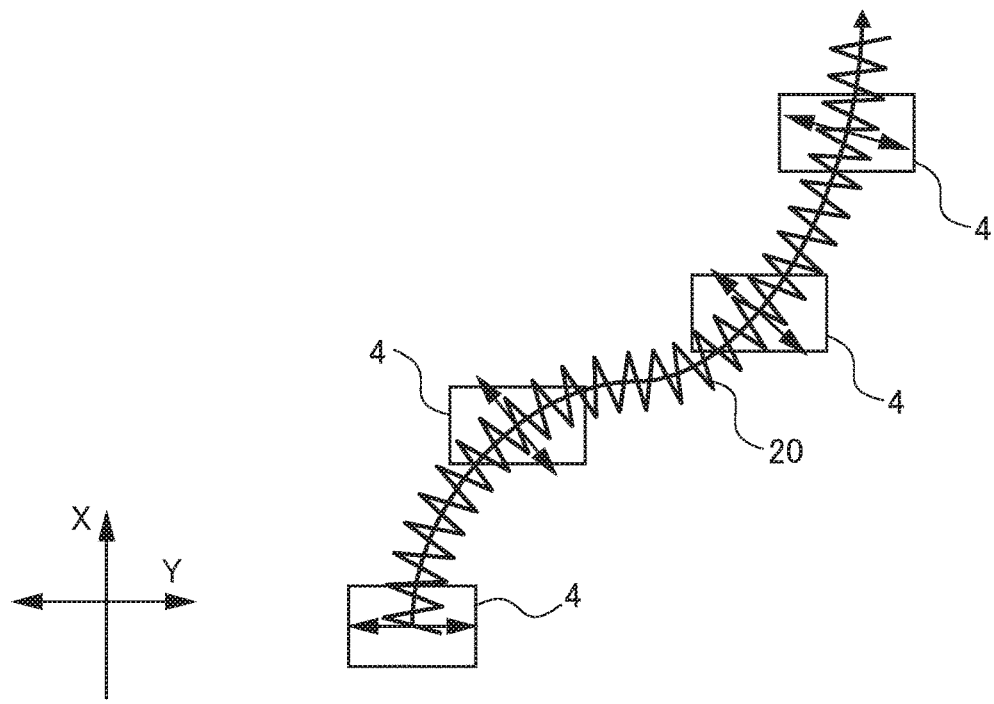
FIG. 6A is a diagram that explains the effects of the laser machining apparatus according to the present invention.
Figure 6B:
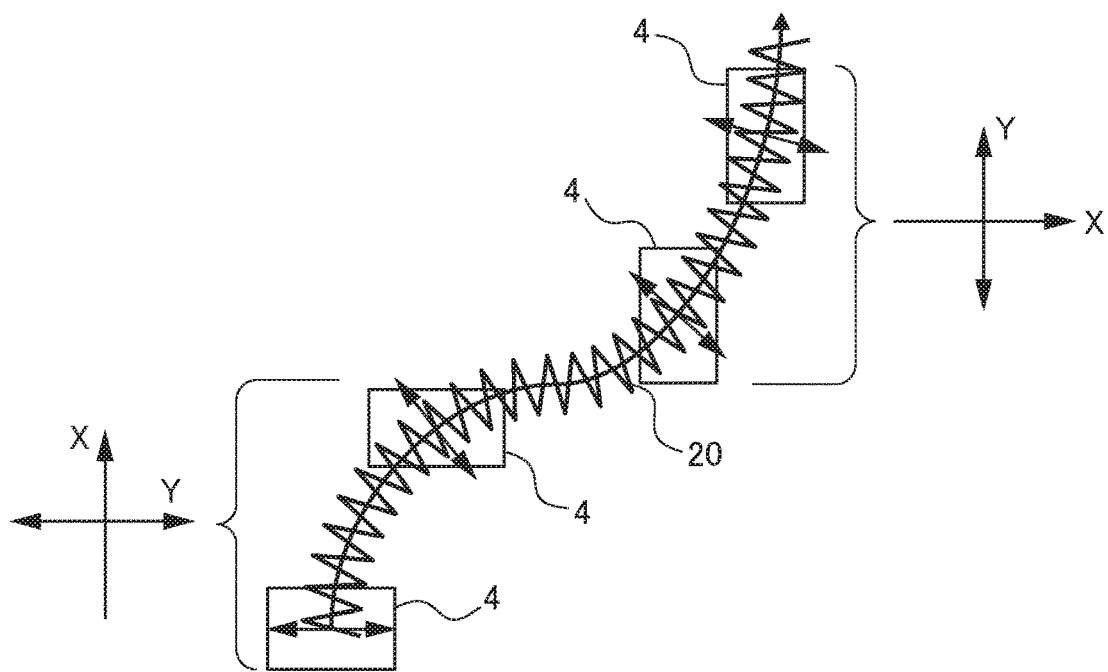
FIG. 6B is another diagram that explains the effects of the laser machining apparatus according to the present invention.

The operation and effects of the laser machining apparatus 1 according to the first embodiment are described below with reference to FIG. 4 to FIG. 6A and FIG. 6B. FIG. 4 is a diagram schematically illustrating the state in which the rotation angle of the scanner head 4 is shifted. FIG. 5 is a diagram illustrating the welding locus formed on the workpiece 10 by the scanner head 4 shown in FIG. 4. Each of FIG. 6A and FIG. 6B is a diagram illustrating the rotation angle of the scanner head 4 and the welding locus with respect to the machining path. It is noted that the page surface in each of FIG. 4 to FIG. 6A and FIG. 6B corresponds to the surface of the workpiece 10.

The robot control apparatus 5 of the laser machining apparatus 1 controls the driving of respective robot motors, thereby moving the scanner head 4 at a predetermined robot speed along the machining path as instructed. As a result, the scanner head 4 moves at a predetermined speed in the direction along the machining path (the direction indicated by each of the outlined arrows in FIG. 4 and FIG. 5). The scanner control apparatus 6 of the laser machining apparatus 1 rotates the respective galvanometer mirrors 41, 42 by rotational driving of the respective galvano motors 41a, 42a so that the intersecting direction of the laser beam L is orthogonal to the moving direction of the scanner head 4 in the process where the scanner head 4 moves along the machining path.

As shown in FIG. 4, in the case where the rotation angle of the scanner head 4 is shifted by an angle θ with respect to the moving direction of the scanner head 4, the angle θ is detected by the rotation angle detection unit 5e of the robot control apparatus 5 in each predetermined control cycle on the basis of the driving information of the respective robot motors of the robot 2. The data on the rotation angle detected every time is output to the mirror angle calculation unit 6g of the scanner control apparatus 6. Every time the scanner control apparatus 6 receives the data on the rotation angle of the scanner head 4 from the robot control apparatus 5, the scanner control apparatus 6 calculates the optimum rotational driving angles of the galvanometer mirrors 41, 42 so that the laser beam L is output in the predetermined swing width W and that the intersecting direction of the laser beam L is orthogonal to the moving direction of the scanner head 4. Then, the scanner control apparatus 6 drives the respective galvano motors 41a, 42a to be rotated on the basis of the calculation result.

Accordingly, even when the rotation angle of the scanner head 4 is shifted by the angle θ with respect to the moving direction of the scanner head 4, the laser beam L output from the scanner head 4 is used for scanning in the desired direction orthogonal to the machining path. As a result, as shown FIG. 5, a zigzag welding locus 20 is formed so as to have the predetermined swing width W and intersect the machining path on the workpiece 10 in the predetermined direction.

As described above, the laser machining apparatus 1 according to the first embodiment is capable of scanning the workpiece 10 with the laser beam L output from the scanner head 4 in a predetermined direction, just by giving instruction regarding the tip point of the robot 2 along the machining path even when the rotation angle of scanner head 4 is shifted with respect to the moving direction of the scanner head 4.

Accordingly, the laser machining apparatus 1 is capable of maintaining the quality of welding by forming the welding locus 20 having a predetermined swing width and intersecting the machining path in a predetermined direction, even in the case where, as shown in FIG. 6A as an example, although the rotation angle of the scanner head 4 with respect to the workpiece 10 is not shifted, the moving direction of the scanner head 4 is shifted in the Y direction along the machining path, or even in the case where, as shown in FIG. 6B as an example, the rotation angle of the scanner head 4 with respect to the workpiece 10 is shifted by 90 degrees, and in addition, the moving direction of the scanner head 4 is shifted in the Y direction along the machining path.

The rotation angle of the scanner head 4 with respect to the moving direction of the scanner head 4 is not limited to the one shifted as shown in FIG. 6A or FIG. 6B. The laser machining apparatus 1 according to the present invention is capable of forming a welding locus having a predetermined swing width and intersecting a machining path in a predetermined direction as described above, even in the case where the rotation angle of the scanner head 4 with respect to the moving direction of the scanner head 4 is slightly shifted.

Second Embodiment

Figure 7:
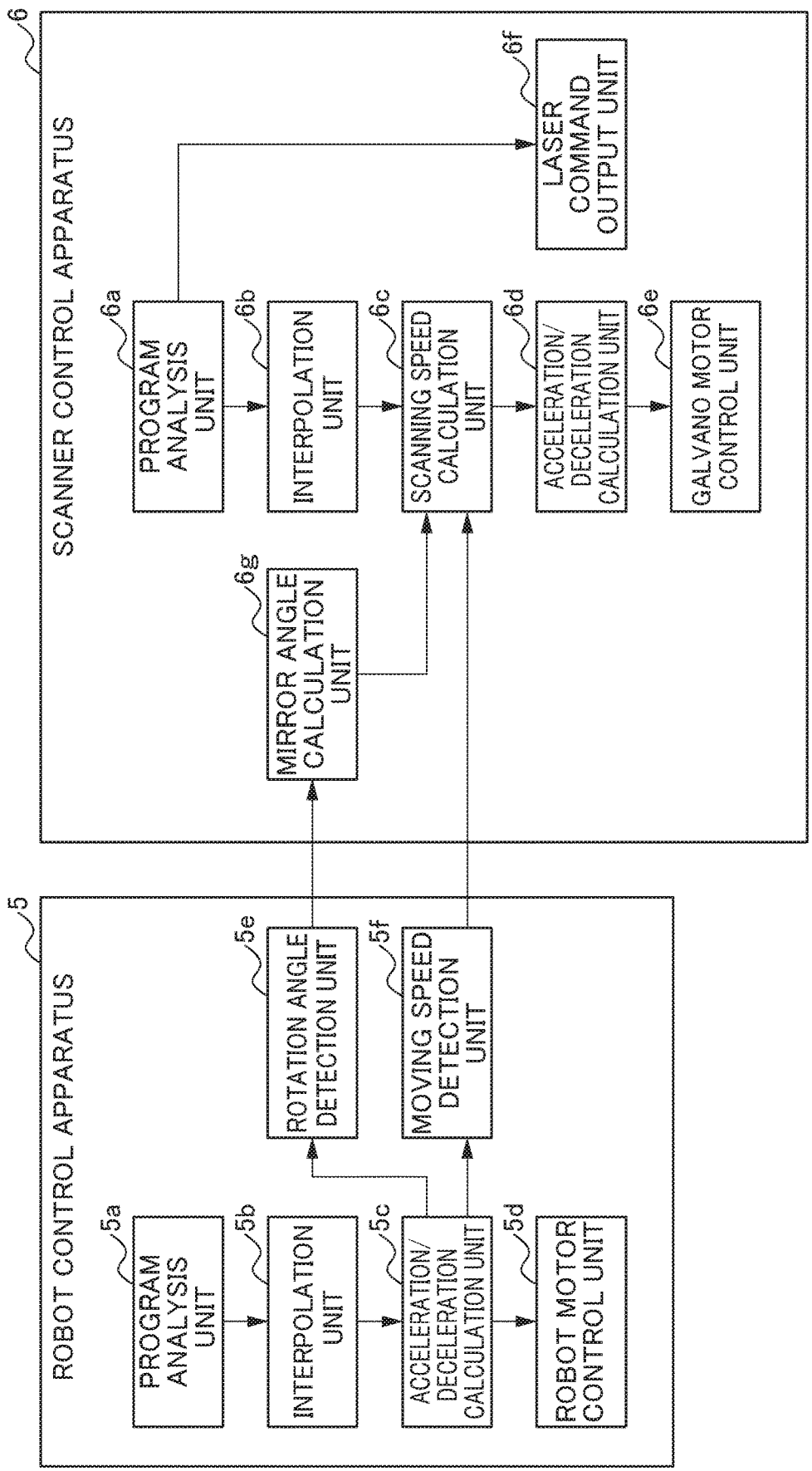
FIG. 7 is a block diagram illustrating the configurations of a robot control apparatus and a scanner control apparatus of a laser machining apparatus according to a second embodiment.

FIG. 7 is a block diagram illustrating the configurations of a robot control apparatus 5 and a scanner control apparatus 6 of a laser machining apparatus 1 according to a second embodiment. Since the portions given the same reference numerals as those in the block diagram shown in FIG. 3 have the same composition, the explanation for the block diagram shown in FIG. 3 is cited and such explanation will be omitted here, except for the explanation below. In the robot control apparatus 5 according to the second embodiment, a moving speed detection unit 5f is added to the robot control apparatus 5 in the first embodiment.

The moving speed detection unit 5f of the robot control apparatus 5 detects the moving speed of the scanner head 4 moved by the robot 2 in each predetermined control cycle as in the rotation angle detection unit 5e. The moving speed of the scanner head 4 is detected from the driving information output by the acceleration/deceleration calculation unit 5c to the robot motor control unit d of the robot control apparatus 5. Accordingly, the acceleration/deceleration calculation unit 5c of the robot control apparatus 5 in the second embodiment outputs the generated driving information of respective robot motors also to the moving speed detection unit 5f.

The moving speed detection unit 5f calculates the moving speed of the scanner head 4 with respect to the workpiece 10 by detecting the constantly changing robot speed during when the scanner head 4 is moved along the machining path, from the driving information of the respective robot motors output by the acceleration/deceleration calculation unit 5c in each predetermined control cycle. The data on the moving speed calculated every time is output to the scanning speed calculation unit 6c of the scanner control apparatus 6.

Figure 8:
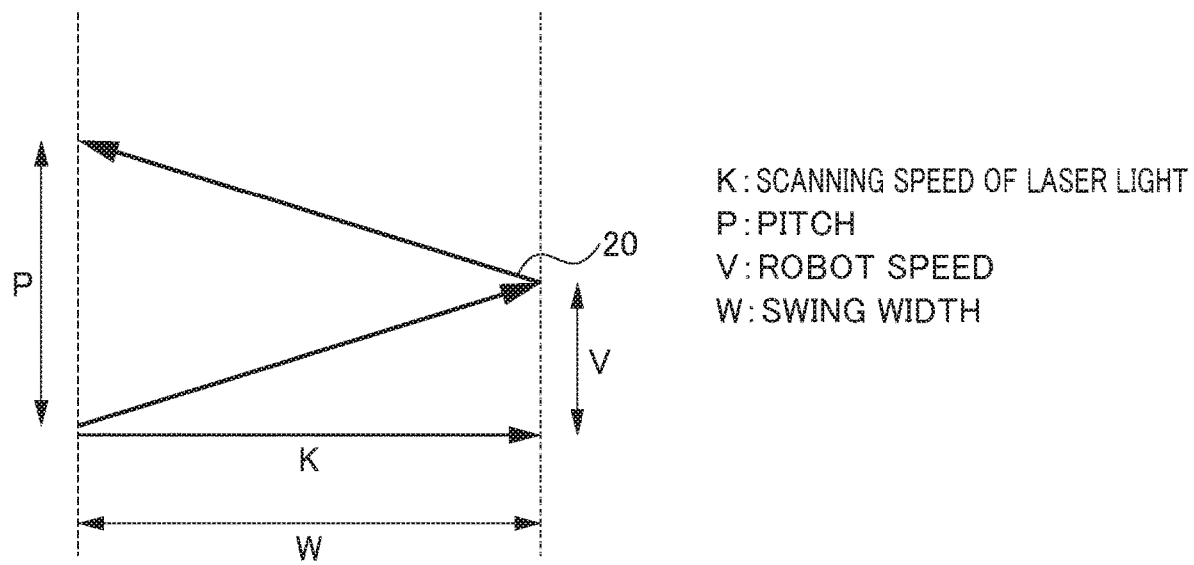
FIG. 8 is a diagram that explains the relationship between a scanning speed K of a laser light, a pitch P, a robot speed V, and a swing width W.

The scanning speed calculation unit 6c of the scanner control apparatus 6 in the second embodiment receives the data on the moving speed of the scanner head 4 detected by the moving speed detection unit 5f in each predetermined control cycle. Then, the scanning speed calculation unit 6c newly calculates a scanning speed K (K=2VW/P) of the laser beam L satisfying the following relation of scanning speed K of laser beam L to robot speed V is equal to swing width W to half of pitch P, as shown in FIG. 8, on the basis of the received data on the moving speed, the interpolation information output by the interpolation unit 6b, and the data on the rotational driving angles of the galvanometer mirrors 41, 42 output by the mirror angle calculation unit 6g. The scanning speed K of the laser beam L corresponds to the scanning speed at which the welding locus 20 of the laser beam L on the workpiece 10 always has the predetermined pitch. P.

The data on the scanning speed calculated by the scanning speed calculation unit 6c is output to the acceleration/deceleration calculation unit 6d. As a result, the scanner control apparatus 6 controls the driving of the galvano motors 41a, 42a so that the laser beam L is used for scanning at the scanning speed newly calculated by the scanning speed calculation unit 6c.

The operation and effects of the laser machining apparatus 1 according to the second embodiment are described below. The moving speed of the scanner head 4 may not be constant in the case of a machining path on the workpiece 10 including a curve. This is because, even when the scanner head 4 is moved at the targeted robot speed, the robot speed is inevitably accelerated and decelerated at some positions such as a position where a curve starts or a position where a curve ends. As a result, even when scanning is performed with the laser beam L output from the scanner head 4 onto the workpiece 10 in the predetermined swing width K, the pitch P of the welding locus 20 may vary upon a change in the robot speed.

However, in the scanner control apparatus 6 according to the second embodiment, the scanning speed calculation unit 6c newly calculates the scanning speed K (K=2VW/P) synchronized with the robot speed V in each predetermined control cycle, by use of the following relation of scanning speed K to robot speed V is equal to swing width K to half of pitch P. Therefore, the laser machining apparatus 1 according to the second embodiment is capable of producing the effects of scanning the workpiece 10 with the laser beam L at the optimum scanning speed of the laser beam L synchronized with the moving speed of the scanner head 4 even when the moving speed of the scanner head 4 changes due to acceleration/deceleration of the robot speed of the robot 2 during laser machining, in addition to the above-described effects of the laser machining apparatus 1 according to the first embodiment. Accordingly, the laser machining apparatus 1 according to the second embodiment is capable of forming the welding locus 20 having the predetermined pitch P with respect to the machining path on the workpiece 10, thereby enabling an improvement in the quality of welding.

Third Embodiment

Figure 9:
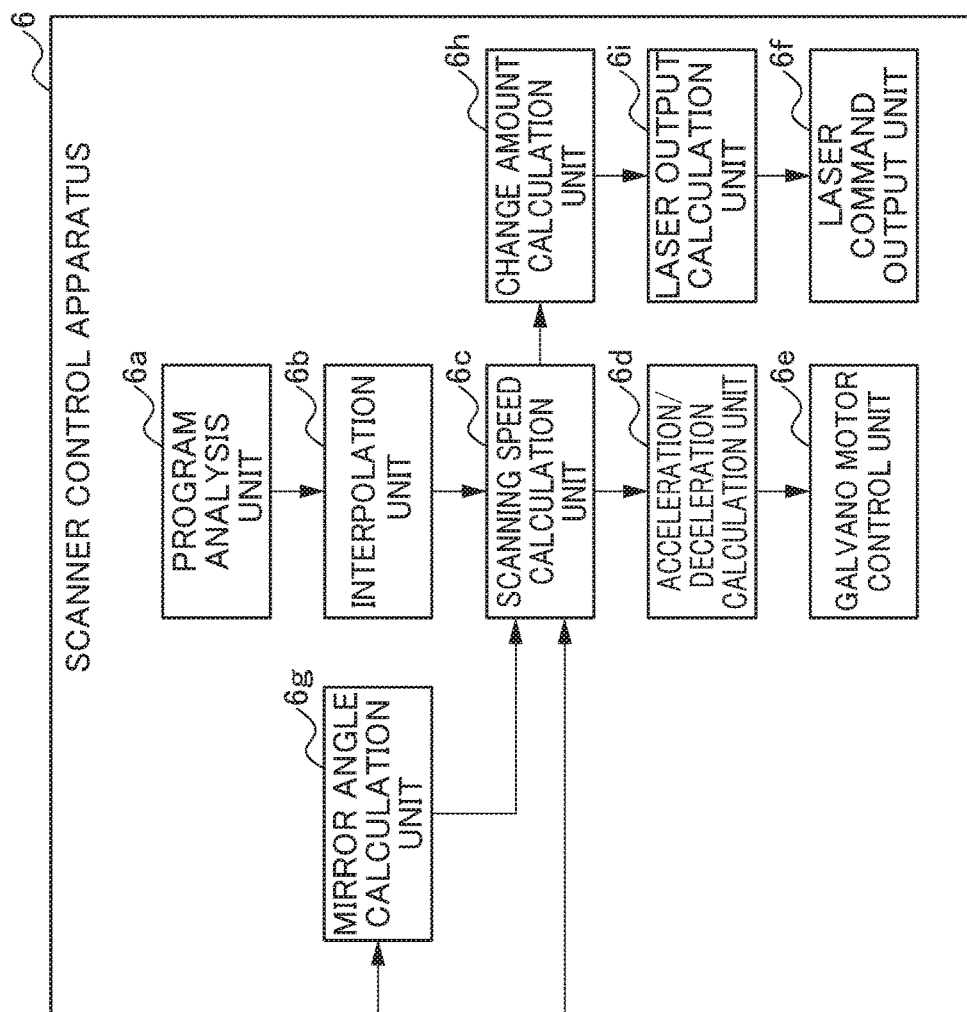
FIG. 9 is a block diagram illustrating the configurations of a robot control apparatus and a scanner control apparatus of a laser machining apparatus according to a third embodiment.

FIG. 9 is a block diagram illustrating the configurations of a robot control apparatus 5 and a scanner control apparatus 6 of a laser machining apparatus 1 according to a third embodiment. Since the portions given the same reference numerals as those in the block diagrams shown in FIG. 3 and FIG. 7 have the same composition, the explanation f 2 the block diagrams shown in FIG. 3 and FIG. 7 is cited and such explanation will be omitted here, except for the explanation below. In the scanner control apparatus 6 according to the third embodiment, a change amount calculation unit 6h and a laser output calculation unit 6i are added to the scanner control apparatus 6 in the second embodiment.

The change amount calculation unit 6h calculates a change amount of the scanning speed newly calculated by the scanning speed calculation unit 6c with respect to a preset reference speed value. The reference speed value is the initial speed value calculated by the scanning speed calculation unit 6c on the basis of the interpolation information output by the interpolation unit 6b. The reference speed value is defined by the speed at which the scanner head 4 linearly moves at a targeted constant robot speed. The change amount calculation unit 6h calculates a change amount which is a difference between the reference speed value and the scanning speed newly calculated by the scanning speed calculation unit 6c in each predetermined control cycle. The data on the calculated change amount is output to the laser output calculation unit 6i.

The laser output calculation unit 6i calculates a new laser output which is increased or decreased upon increase or decrease of the change amount, on the basis of the data on the change amount output by the change amount calculation unit 6h. That is, in the case where the new scanning speed is greater than the reference speed value, the laser output calculation unit 6i obtains the data on the new greater laser output. On the other hand, in the case where the new scanning speed is lower than the reference speed value, the laser output calculation unit 6i obtains the data on the new lower laser output.

A welding speed F (the speed along the welding locus 20) is obtained by $F=V\sqrt{(4W^2/P^2+1)}$, in a relation among the robot speed V, the swing width W, and the pitch P. The laser output calculation unit 6i newly obtains a laser output S synchronized with the welding speed F by $S=S_0 \times F/F_0$, wherein $S_0$ denotes a reference laser output and $F_0$ denotes a reference welding speed. The data on the newly calculated laser output is output to the laser command output unit 6f.

The laser command output unit 6f outputs the laser output command to the laser oscillator 3 on the basis of the data on the laser output which has been newly output by the change amount calculation unit 6h, so that the laser beam L to be output from the scanner head 4 corresponds to the laser output based on the data on the new laser output.

The operation and effects of the laser machining apparatus 1 according to the third embodiment are described below. In general, there is a concern that the light quantity of the laser beam L with which the machining point (welding point) is irradiated increases or decreases upon the change in the moving speed of the scanner head 4, and thus a welding penetration degree of the workpiece 10 may change. Since the laser machining apparatus 1 according to the third embodiment increases or decreases the scanning speed of the laser beam L in accordance with the change in the moving speed of the scanner head 4, the increase/decrease of the scanning speed of the laser beam L corresponds to the change in the moving speed of the scanner head 4.

The scanner control apparatus 6 according to the third embodiment, in which the change amount calculation unit 6h and the laser output calculation unit 6i are added to the scanner control apparatus 6 according to the second embodiment, is capable of producing not only the effects of the laser machining apparatus 1 according to the second embodiment, but also the effects of performing scanning with the laser beam L at the new scanning speed corresponding to the moving speed of the scanner head 4 and the effects of irradiating the workpiece 10 with the laser beam L having a laser output increased or decreased upon the increase or decrease in the scanning speed of the laser beam L. Accordingly, in the scanner control apparatus 6 according to the third embodiment, even when the moving speed of the scanner head 4 increases or decreases at the beginning or the end of a curve of the machining path and accordingly the scanning speed of the laser beam L changes, the laser beam L is output increasingly or decreasingly upon the change in the scanning speed, thereby enabling to produce the effects of further improving the quality of welding without unevenness in the welding penetration degree of the workpiece 10.

Figure 10:
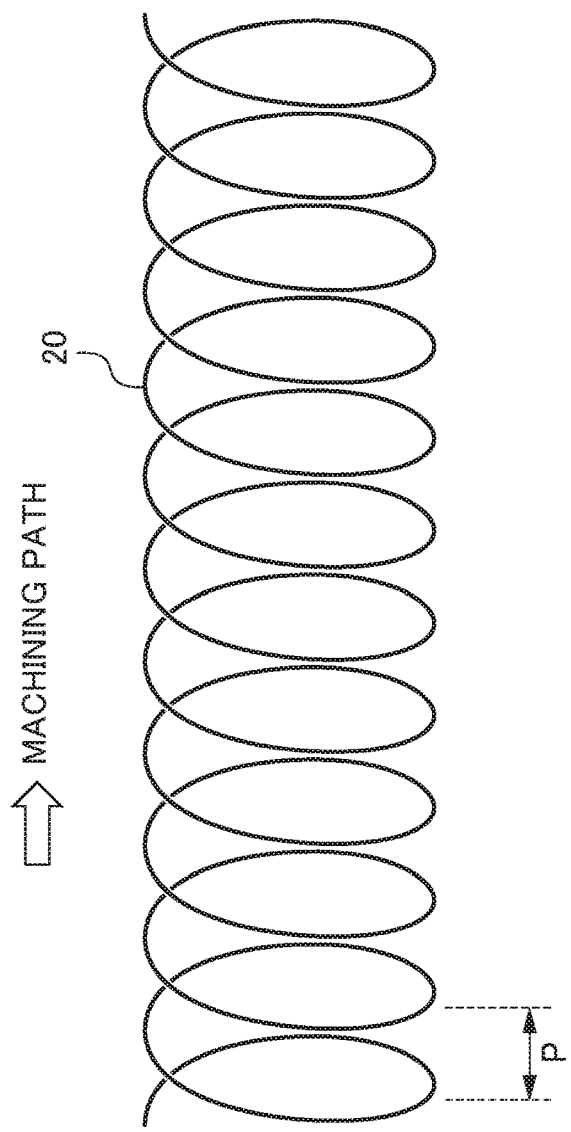
FIG. 10 is a diagram that explains wobbling welding applicable to the laser machining apparatus according to the present invention.
Figure 10:
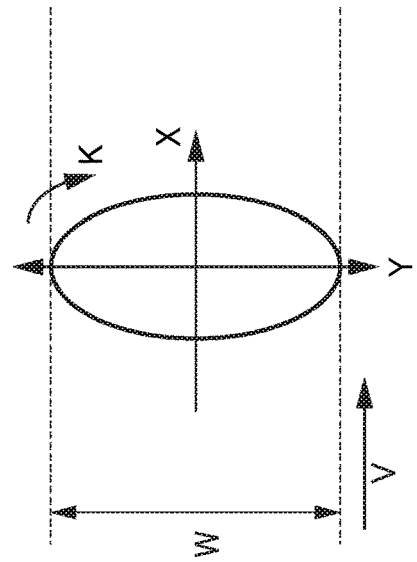
Figure 11:
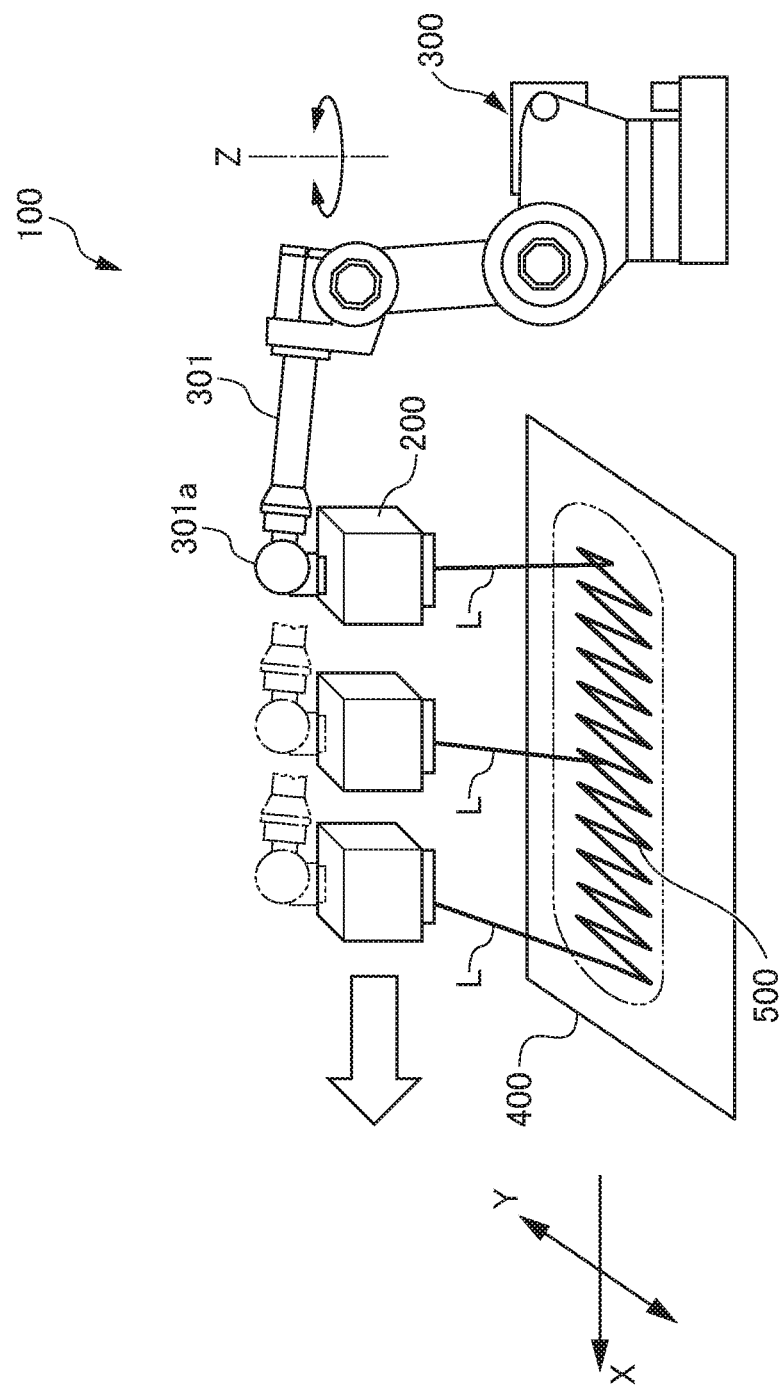
FIG. 11 is a diagram illustrating a conventional laser machining apparatus.
Figure 12:
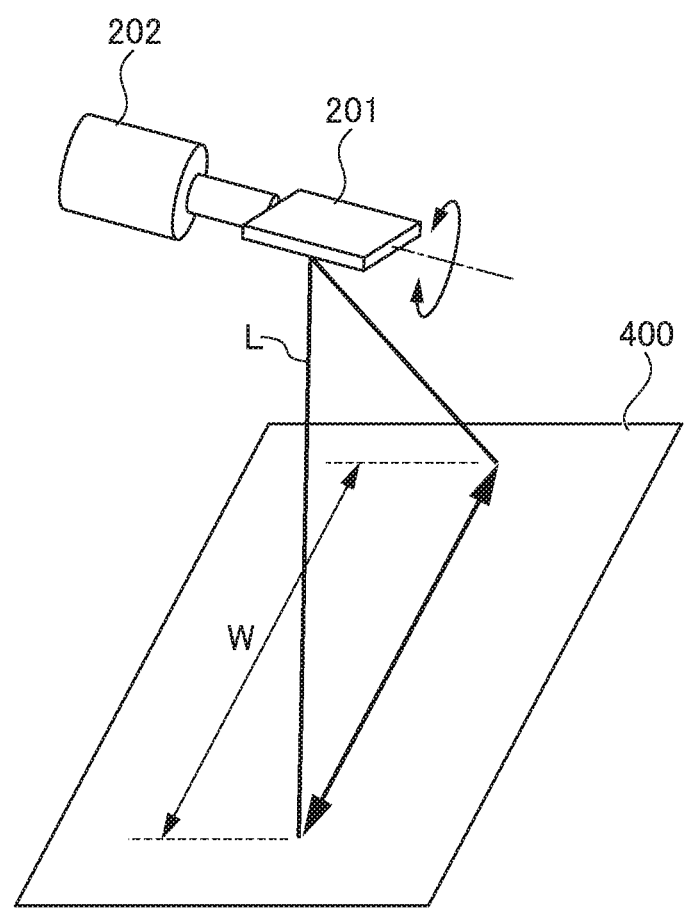
FIG. 12 is a diagram that explains an optical system of a scanner head of the conventional laser machining apparatus.

In the above description, the laser machining apparatus 1 performs weaving welding by outputting the laser beam L for scanning in the direction orthogonal to the moving direction of the scanner head 4 to form a zigzag welding locus on the workpiece 10. However, the present invention is not limited thereto. The laser machining apparatus according to the present invention may be any apparatus as long as the laser beam L is output for scanning from the scanner head 4 to the workpiece 10 in a direction intersecting the moving direction of the scanner head 4. Accordingly, as shown in FIG. 10 as an example, the laser machining apparatus according to the present invention is also available in the case of performing wobbling welding, by outputting the laser beam L from the scanner head 4, for scanning in an elliptical shape having a predetermined swing width W to form a coil-shape welding locus 20 having a predetermined pitch P on the workpiece 10.

Although the case where the intersecting direction of the laser beam L is orthogonal to the moving direction of the scanner head 4 has been described above, the present invention is not limited to such a case. A laser machining apparatus according to the present invention may control the scanner head 4 so that the scanning direction of the laser beam L intersects the moving direction of the scanner head 4.

A laser machining apparatus according to the present invention may be configured to move a scanner head along a guide rail as an example, not being limited to the configuration in which the robot 2 moves the scanner head 4.

Furthermore, a scanner head in a laser machining apparatus according to the present invention may have three or more galvanometer mirrors respectively rotated by independent galvano motors.

EXPLANATION OF REFERENCE NUMERALS

1 LASER MACHINING MACHINE
2 ROBOT (MOVING MEANS)
3 LASER OSCILLATOR
4 SCANNER HEAD
41, 42 GALVANOMETER MIRROR
41a, 42a GALVANO MOTOR
5 ROBOT CONTROL APPARATUS (MOVEMENT CONTROL APPARATUS)
5e ROTATION ANGLE DETECTION UNIT
5f MOVING SPEED DETECTION UNIT
6 SCANNER CONTROL APPARATUS
6e GALVANO MOTOR CONTROL UNIT
6f LASER COMMAND OUTPUT UNIT
6g MIRROR ANGLE CALCULATION UNIT
6h CHANGE AMOUNT CALCULATION UNIT
6i LASER OUTPUT CALCULATION UNIT
10 WORKPIECE
20 WELDING LOCUS
L LASER BEAM
P PITCH
W SWING WIDTH

What is claimed is:

1. A laser machining apparatus comprising:

a scanner head having at least two galvanometer mirrors for reflecting a laser beam and galvano motors for rotationally driving the respective galvanometer mirrors, the scanner head being capable of scanning a workpiece with the laser beam;

a moving means for moving the scanner head with respect to the workpiece;

a movement control apparatus for moving the scanner head along a machining path as instructed by controlling the moving means; and a scanner control apparatus having a galvano motor control unit for controlling the rotational driving angles of the galvano motors, so that the laser beam is output for scanning from the scanner head to the workpiece in a direction intersecting a moving direction of the scanner head, wherein the movement control apparatus has a rotation angle detection unit for detecting a rotation angle of the scanner head with respect to the moving direction of the scanner head, the scanner control apparatus has a mirror angle calculation unit for receiving data on the rotation angle of the scanner head detected by the rotation angle detection unit and calculating, from the data on the rotation angle, rotational driving angles of the galvanometer mirrors so that the intersecting direction of the laser beam corresponds to a predetermined direction with respect to the moving direction of the scanner head, and the galvano motor control unit of the scanner control apparatus controls the galvano motors so that the rotational driving angles of the galvanometer mirrors correspond to the rotational driving angles calculated by the mirror angle calculation unit.

2. The laser machining apparatus according to claim 1, wherein the movement control apparatus has a moving speed detection unit for detecting a moving speed of the scanner head moved by the moving means, a locus of the laser beam output for scanning the workpiece has a predetermined swing width and a predetermined pitch, the scanner control apparatus has a scanning speed calculation unit for receiving data on the moving speed of the scanner head detected by the moving speed detection unit, and newly calculating, from the data on the moving speed, a scanning speed so that the locus of the laser beam output for scanning the workpiece has the predetermined pitch, and the galvano motor control unit of the scanner control apparatus controls the galvano motors so that the laser beam is output for scanning at the scanning speed newly calculated by the scanning speed calculation unit.

3. The laser machining apparatus according to claim 2, the laser machining apparatus further comprising a laser oscillator for outputting the laser beam to the scanner head, wherein the scanner control apparatus has a change amount calculation unit for calculating a change amount of the scanning speed newly calculated by the scanning speed calculation unit with respect to a preset reference speed value, a laser output calculation unit for newly calculating a laser output increased or decreased upon increase or decrease of the change amount calculated by the change amount calculation unit, and a laser command output unit for outputting a laser command to the laser oscillator so that the laser beam output by the laser oscillator corresponds to the laser output newly calculated by the laser output calculation unit.

* * * * *